UNITED STATES PATENT OFFICE.

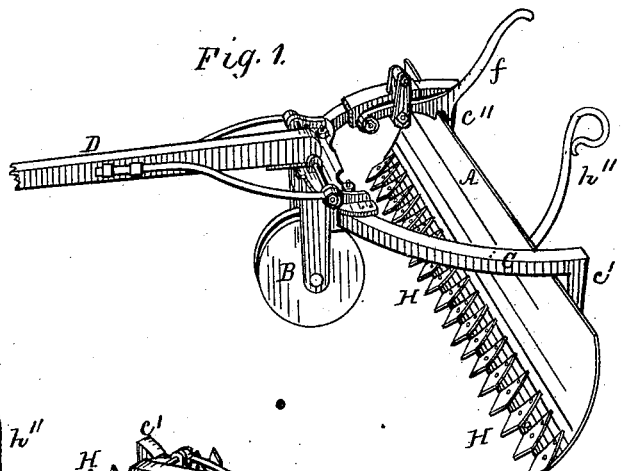
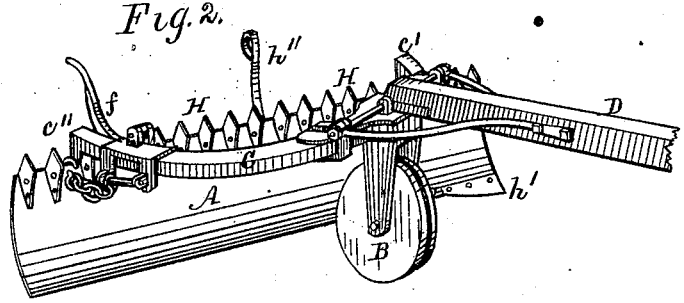
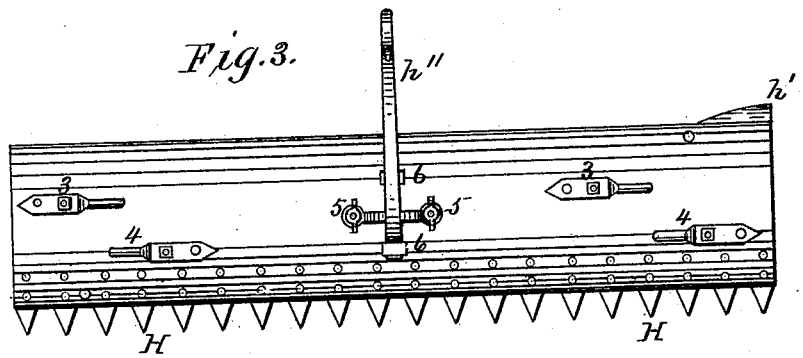

WILLIAM PATTERSON, OF SALEM, NEW JERSEY.

IMPROVEMENT IN ROAD-SCRAPERS.

Specification forming part of Letters Patent No. 178,948, dated June 20, 1876; application filed May 19, 1876.

*To all whom it may concern:*

Be it known that I, WILLIAM PATTERSON, of Salem, in the county of Salem and State of New Jersey, have invented a new and useful Improvement in Road-Scrapers, which improvement is fully set forth in the annexed specification, reference being had to the accompanying drawings, in which—

Figure 1 is a perspective view, from the left-hand side of the machine or implement, having the scraper-plate adjusted at right angles to the line of draft, and its toothed edge in contact with the ground. Fig. 2 is a perspective view, from the right-hand side, of the same implement, having the scraper-plate adjusted obliquely to the line of draft, and its straight edge in contact with the ground; and Fig. 3, a view of the rear side of the scraper-plate detached, and with its toothed edge in contact with the ground.

My invention relates more especially to road-scraper patented by me May 30, 1865, No. 47,977; and has for its object the rendering of said implement more effective in tearing away the loosened sod and rooty earth broken up by the plow, and transferring the same from the sides of the roadway to such places thereof as may be desired; and, also, in so constructing and attaching the scraper-plate with a serrated or toothed edge, and a straight or even edge, that either can be readily brought into action, as the character of the earth and the direction in which it is to be moved may render necessary or proper.

Referring to the drawings, the draft-pole or tongue D and its bow C, with the hooked arms $c'$ $c''$, concave plate A, detaching-lever $f$, and carrying-wheel B, are the same as those described and shown in my said Letters Patent, and operate together substantially in the same manner and for the same purposes set forth therein.

In my present improvement the curved or concave plate A has one of its two longer edges serrated, or provided with a series of sharp-pointed teeth, H H, riveted fast, so as to project from the edge of the plate, and in the same plane therewith, as shown in the drawings. The opposite edge of said concave plate remains straight, as in my said patented scraper, with the exception that at one end of said straight edge there is a forward-projecting triangular shear or cutter, $h'$, riveted fast, as shown in Figs. 2 and 3.

Riveted fast to the rear or convex side of the curved plate A there are two pairs of aligned journals, 3 3 and 4 4, each pair being arranged at the same distance from its respective edge of the plate, and each two journals of each pair at the same distance apart from each other, as represented in Fig. 3.

The object in providing the two pairs 3 3 and 4 4 is to enable the operator to connect the plate A to the tongue D with either the straight or the toothed side edge of the plate in contact with the ground to be operated upon, as represented by Figs. 1 and 2, respectively; and for the same reason the hand-lever $h''$ is secured to the back of the plate A in an adjustable manner, so that it can be readily changed to project upward from either of the two long side edges which may be upward, substantially as represented in said Figs. 1 and 2.

The lower portion of the hand-lever $h''$ has two lateral branches, 5 5, (see Fig. 3,) each having an eye in its outer end, through which a screw-bolt in the plate A passes; and a nut on the end of said bolt holds the two respective branches fast to the plate, while the extreme lower end of said hand-lever is held firmly by one of two staples, 6 6, which are fixed to the back of said plate, in accordance with whichever side edge of the plate may be required to be in contact with the ground.

In using my present improved scraper, if it be desired to tear away and carry forward the broken sods and rooty earth broken up by the usual plow in advance, as in cutting new roads, the serrated or toothed edge of the plate A must be adjusted to rest in contact with the ground, and then the tongue D adjusted at right angles to the plate A, as represented in Fig. 1. But if it be desired to cut and scrape the loose earth along one side of the road, and to ridge it up therefrom toward the center, as is generally required in road making and mending, the plate A must be adjusted with its straight edge resting on the ground, and the tongue D then adjusted obliquely toward the side of the road from which the earth is to be removed, substantially as shown in Fig.

2, thus causing the cutting or shear point $h'$ to lead or be in advance of the rest of the straight edge of said plate A, and cause the loose earth to be ridged up toward the middle of the road.

I claim as my invention—

1. The reversible plate A, having one of its long edges provided with a series of pointed projecting teeth, H H, and its opposite edge left plain and straight to the shearing-point $h'$, substantially as described, for the respective purposes specified.

2. The combination, with the rear or convex side of the reversible scraper-plate A, of the adjustable reversible hand-lever $h''$, substantially as and for the purpose set forth.

3. In combination with the rear side of a reversible scraper-plate of a road or earth scraper, the double or two pairs of the journals 3 3 and 4 4, for the purposes specified.

WILLIAM PATTERSON.

Witnesses:
BENJ. MORISON,
WM. H. MORISON.